United States Patent [19]

Tansi

[11] 4,202,457
[45] May 13, 1980

[54] FOLDABLE ELECTRICAL OUTLET BOX

[75] Inventor: Hakki M. Tansi, Woodbury, N.Y.

[73] Assignee: Eagle Electric Mgf. Co., Inc., Long Island City, N.Y.

[21] Appl. No.: 936,862

[22] Filed: Aug. 25, 1978

[51] Int. Cl.² .......................... H02G 3/08; B65D 7/24
[52] U.S. Cl. ...................................... 220/3.3; 220/62; 220/7; 220/3.5
[58] Field of Search ................... 220/3.3, 3.2, 3.5, 62, 220/7

[56] References Cited

U.S. PATENT DOCUMENTS

| | | | |
|---|---|---|---|
| 2,732,090 | 1/1956 | Karlin | 220/62 X |
| 3,349,289 | 10/1967 | Mueller | 220/62 X |
| 3,917,101 | 11/1975 | Ware | 220/3.2 |
| 3,973,692 | 8/1976 | Cloyd | 220/7 |
| 4,071,159 | 1/1978 | Robinson et al. | 220/3.5 X |

*Primary Examiner*—Steven M. Pollard
*Attorney, Agent, or Firm*—Kirschstein, Kirschstein, Ottinger & Cobrin

[57] ABSTRACT

A molded plastic, substantially planar, plate member which, when assembled, forms an open-topped electrical outlet box. The flat plastic plate member has end walls and side walls which are all foldable along living hinges relative to a bottom wall until further movement is prevented by raised projections to thereby form a three-dimensional box. Mounting sleeves are integrally formed in the end walls for receiving mounting nails. Flanges are also integrally formed in the end walls for receiving stamped Tinnerman-type nuts. Channels are integrally formed in the end walls and receive lateral edges of the side walls; slots in the channels receive tabs integrally formed on the lateral edges of the side walls. Additional tabs also integrally formed on the lateral edges of the side walls have U-shaped recesses therein for receiving the stem of the mounting nail with a snap-type action. Resilient flaps are integrally formed in the end walls to permit insertion of an electrical cable therethrough and into the box; the flaps clamp and retain the inserted cable in fixed position within the box.

33 Claims, 17 Drawing Figures

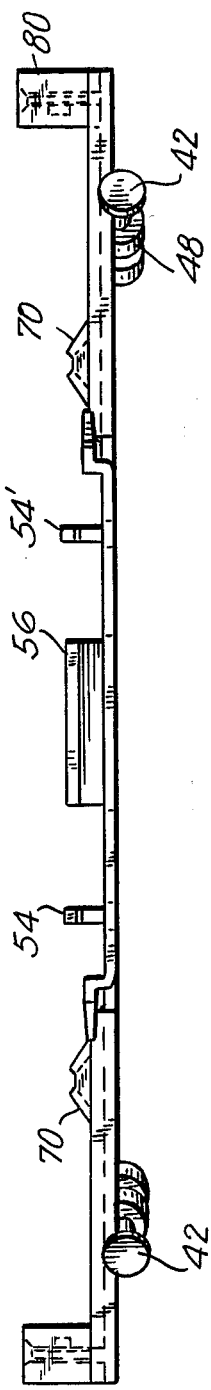
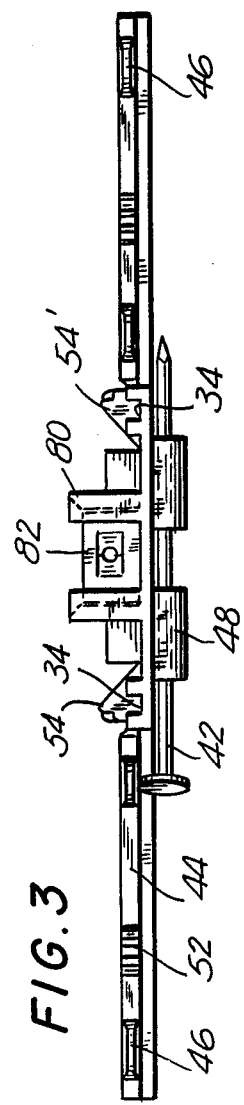
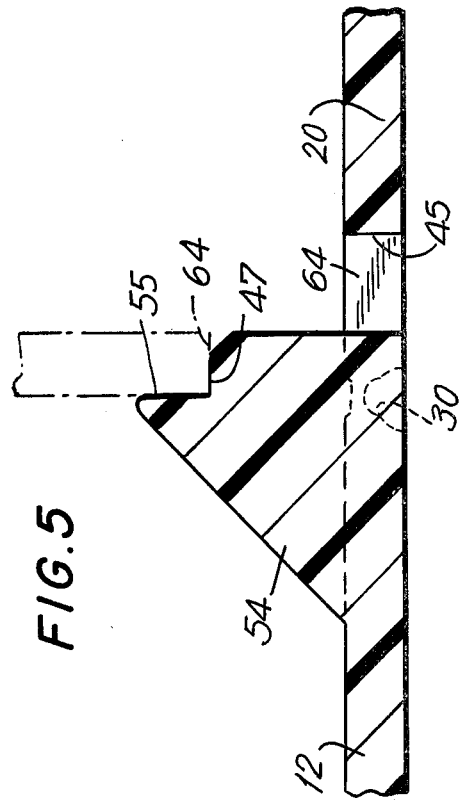
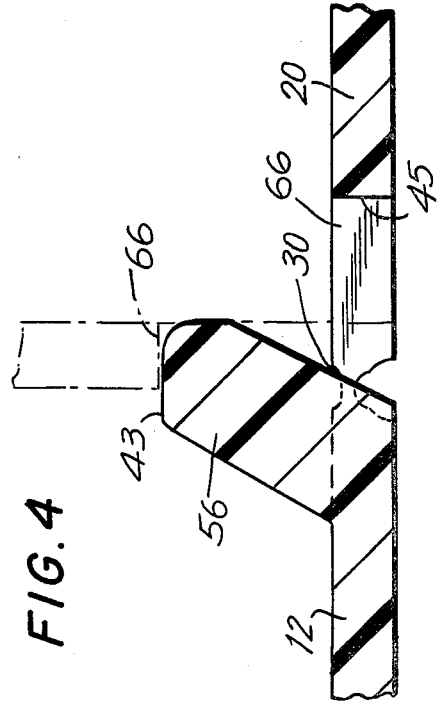
FIG. 2
FIG. 3
FIG. 5
FIG. 4

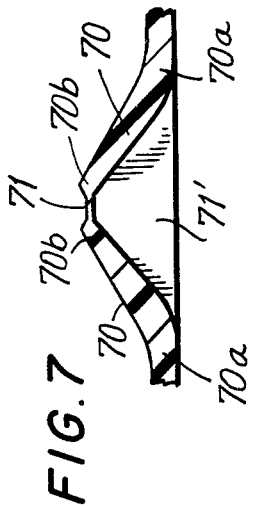
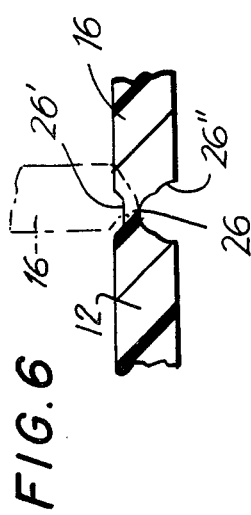
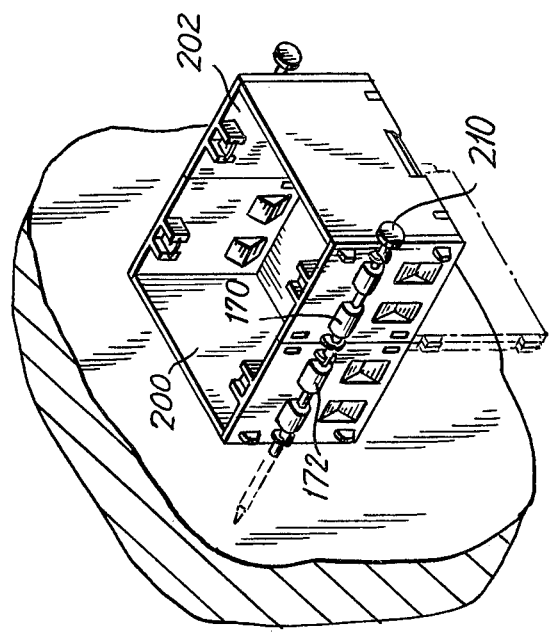
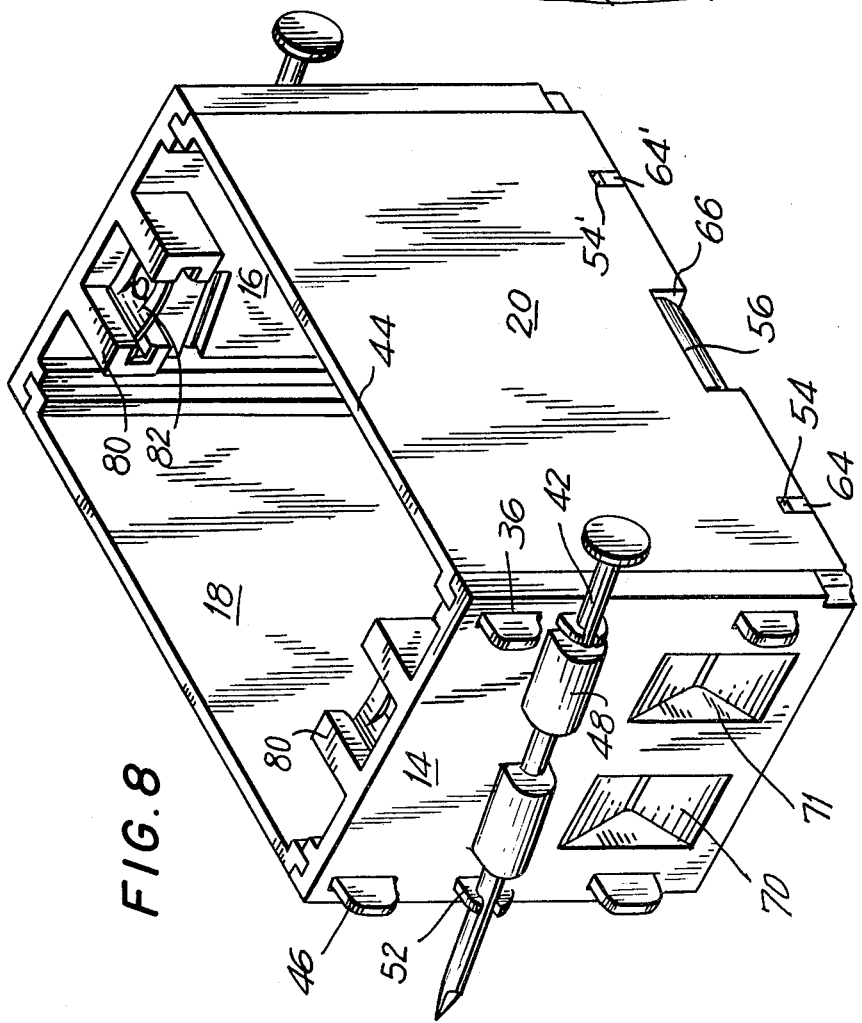

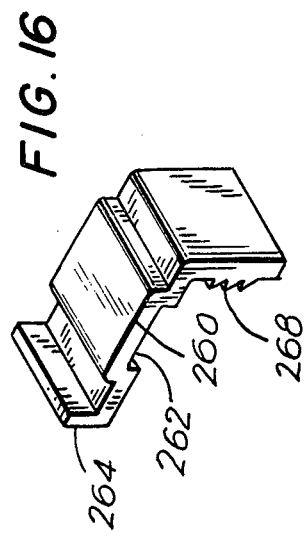
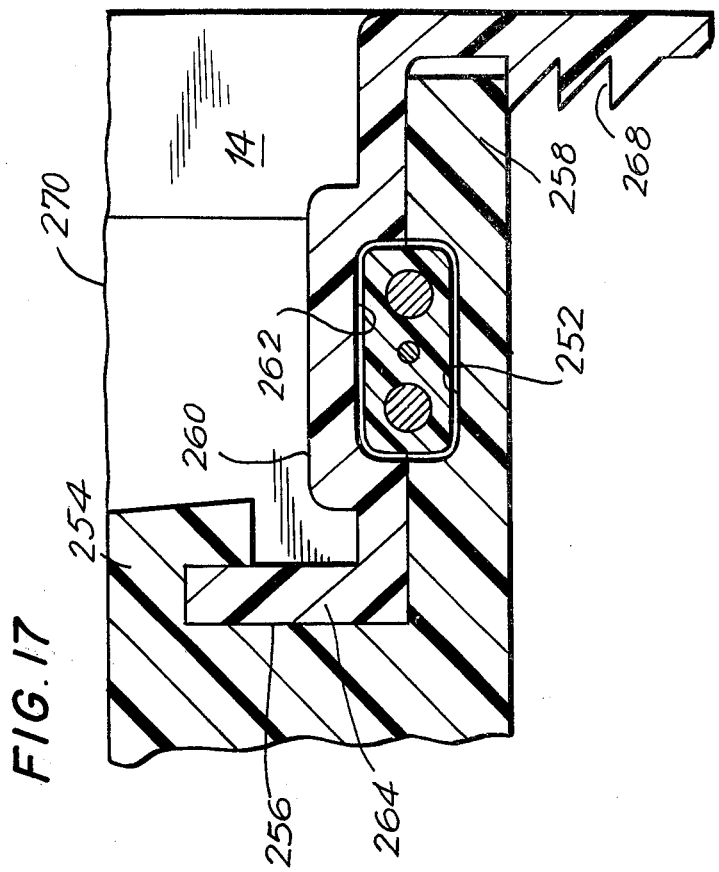
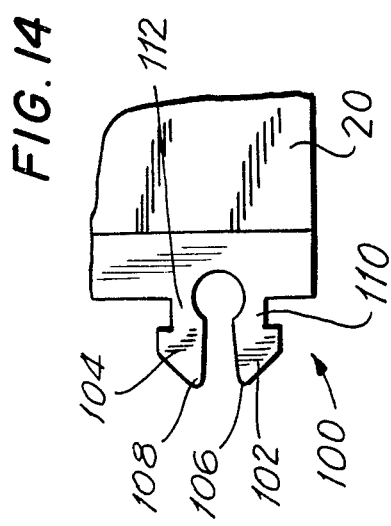
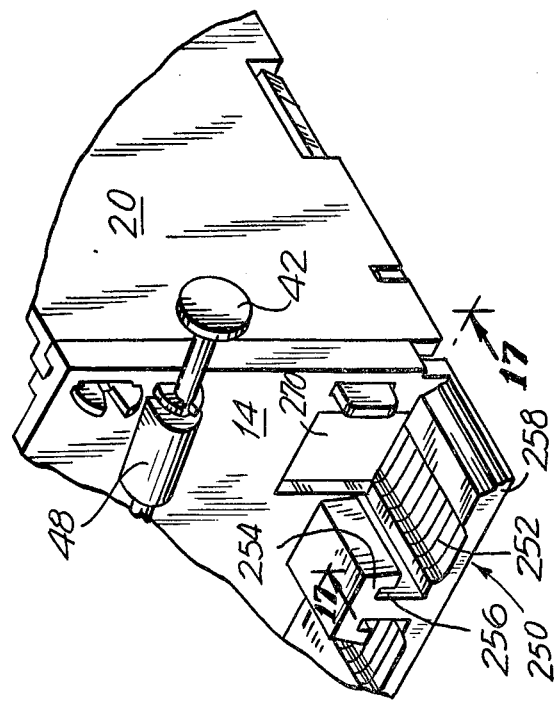

FOLDABLE ELECTRICAL OUTLET BOX

BACKGROUND OF THE INVENTION

1. Field of the Invention

This invention relates to molded plastic electrical outlet boxes and, more particularly, to a plastic blank foldable from a generally flattened position to a folded erect position to thereby form an open-topped, three-dimensional electrical outlet box.

2. Description of the Prior Art

Junction outlet boxes are generally die cast or stamped out of metal. Molded plastic junction outlet boxes are also well known. Generally, the plastic outlet boxes are formed in one piece by a molding operation or the like. An electrical device such as a switch, electrical receptacle, convenience outlet or the like, is mounted by mounting screws in both types of boxes. For this purpose, tapped holes are provided in the metal boxes, and a user must turn the mounting screws all the way down with the aid of a screwdriver to securely mount the electrical device in place within the box. As for plastic boxes, although it has been proposed to provide similar tapped holes therein, stripping of the plastic threads against the metal screw threads has caused manufacturers to use metal inserts that have threaded holes, such as nuts or resilient legs. The insert with resilient legs is preferred since a user can mount the electrical device by pushing the mounting screw in direction lengthwise of the screw with the aid of a screwdriver without damaging the screw threads. Assembly time is significantly reduced because it is not necessary to turn these screws all the way in. Of course, the screws held by the insert must be fully turned out. The resilient legs of the metal insert generally dig into the screw threads when a pulling force is applied to the screws to thereby prevent unauthorized de-mounting.

Because of rigid industrial standards regarding the security of this type of assembly and the design limitations of the insert, such resilient legs generally wind up a considerable distance below the top surface of the outlet box.

Consequently, the effective length of the assembly mounting screws is considerably reduced. Moreover, in order to mold the flanges which contain the metal insert, a considerable amount of volume is taken up inside the outlet box. This, in turn, results in outlet boxes of greater depth in order to comply with industrial requirements for a minimum internal volume of an electrical outlet box. A further disadvantage of the conventional three-dimensional non-foldable plastic outlet box is the shipping cost and large storage space required due to the volume of each box.

Since the conventionl plastic outlet boxes are molded in a single piece, there was no way to provide a strain relief for an electrical cable which was to be inserted into the box. Moreover, the prior art has proposed knock-out sections on the box in order to provide an opening for entrance of the electrical cable. However, it was time consuming for an electrician, i.e., to break out the sections, and frequently a great deal of damage was caused to the structural integrity of the box. Also, it was necessary for the electrician to staple the cable to a beam outside of and in close proximity of the outlet box, another time-consuming operation.

SUMMARY OF THE INVENTION

Purposes of the Invention

Accordingly, it is the general object of the present invention to overcome the aforementioned drawbacks of the prior art.

It is another object of this invention to simplify manufacture of a molded plastic electrical outlet box and to construct the same of light-weight and inexpensive materials.

Another object of this invention is to reliably construct an open-topped molded electrical outlet box by utilizing injection molding techniques.

Still another object of this invention is to provide a substantially planar plastic member or blank which is foldable into a three-dimensional electrical outlet box.

It is an object of this invention to provide a molded substantially planar plastic member having a plurality of rectangular panels which may be folded up and the edges thereof reliably joined together to form an electrical outlet box.

It is also an object of this invention to provide a molded substantially planar plastic member having a plurality of panels which may be folded and joined into an electrical outlet box, the plastic member having means for aligning the folded panels into a preselected orientation.

An object of this invention is to inexpensively manufacture a molded electrical outlet box.

A further object of this invention is to provide an electrical outlet box which may be molded, shaped, handled, transported and stored in a substantially flattened state.

An object of this invention is to provide a molded substantially planar plastic member having a plurality of rectangular panels easily foldable into an assembled electrical outlet box, two of the panels having at least one movable entrance door with tapered lead-in entrance openings for facilitating insertion of electrical cables into the box.

Another object of this invention is to provide a pair of movable entrance doors in at least two rectangular panels forming the walls of an electrical outlet box, which entrance doors have sharp edges which grip or clamp onto an electrical cable inserted through the doors.

An object of this invention is to provide an electrical outlet box in which a conventional metal insert such as a Tinnerman-type nut can be used for the quick mounting of an electrical device, the Tinnerman-type nut being reliably insertable into a molded recess within a mounting boss formed in a side wall of the box.

Another object of this invention is to position a Tinnerman-type quick mounting nut proximate to the outer or top edge of the open-topped box so that the effective length of the electrical device mounting screws is increased.

It is an object of this invention to eliminate internal bosses from the electrical outlet box for the retention of a mounting screw, thus allowing the depth of the outlet box to be shallower than possible with prior art devices and yet meeting the internal volume standards of the industry.

Brief Description of the Invention

In keeping with these objects and others which will become apparent hereinafter, one feature of the invention resides, briefly stated, in a substantially planar molded synthetic plastic material blank adapted for erection into an electrical outlet box of the type in which electrical devices such as switches, electrical receptacles, convenience outlets and the like are mounted. The blank comprises a substantially synthetic plastic material foldable member having five substantially rectangular panels in planar registration. The foldable member includes a generally planar base or inner bottom panel having a pair of opposite longitudinal edges and a pair of opposite transverse edges, a first pair of generally planar side or outer side panels each having an inner edge located at and connected to a respective one of the longitudinal edges to thereby form a respective common edge therewith, and a second pair of generlly planar side or outer end panels each having an inner edge located at and connected to a respective one of the transverse edges to thereby form a respective common edge therewith. Each outer side panel extends transversely away from the longitudinal edges along a first direction and each outer end panel extends transversely away from the transverse edges along a second direction which is substantially orthogonal to the first direction to thereby form a generally cross-shaped configuration.

In further accordance with the present invention, the blank includes living hinge means of one-piece with the foldable member and being located lengthwise along each common edge, the living hinge means being operative for facilitating folding of the outer panels relative to the base panel about respective axes or fold lines along which each common edge extends, between a generally flattened position in which the outer panels lie generally in the same plane as the plane of the base panel, and a folded erect position in which the outer panels assume predetermined positions and lie in respective planes each generally orthogonal to the plane of the base panel.

The blank further includes engaging means of one-piece with the side panels and being operative for engaging lateral edge regions of the outer panels when the latter have been folded to the folded erect position. The blank also includes access means of one-piece with the foldable member and being operative for facilitating insertion of an electrical cable into the interior of the outlet box when the panels have been folded to the erect position. Flange means is still further provided of one-piece with the foldable member and is operative for facilitating mounting of an electrical device into the interior of the electrical outlet box.

In still further accordance with the present invention, alignment means including raised projections having abutment surfaces is provided to prevent the outer panels from moving away from their predetermined erected positions. Furthermore, an integrally formed mounting sleeve is provided within each end panel for receiving a mounting nail. Preferably, the longitudinal axis of the mounting sleeve is transverse to the height of the erected outlet box.

The engaging means comprises an integrally formed channel within each lateral edge of the two end panels for receiving the immediately adjacent lateral edge of the side panels; and at least two slots spaced apart from one another within each of the channels are adapted to receive in mating engagement two corresponding tabs projecting from each lateral edge of the two side panels.

The alignment means comprises two raised projections spaced apart from one another and situated proximate to the fold line between the bottom panel and each of the side panels. The two side panels have slots corresponding to the raised projections and when the side panels are folded along their fold lines into their predetermined erected positions, each raised projection fits within a corresponding slot in the associated two side panels and also abuts against the surface of the two side panels. The abutting contact between the raised projection and the surface of the associated side panel limits movement of the outer panels beyond their predetermined positions and also provides stability to the erected box structure.

The box further comprises an integrally formed mounting sleeve integral with each end panel for receiving a mounting nail, the longitudinal axis of the mounting sleeve being transverse to the end to end dimension of the bottom panel; and a mounting ear projecting from each lateral edge of the two side panels and having a U-shaped recess or yoke adapted to snap over the stem of the mounting nail.

Another feature of the present invention is the two aforesaid integrally formed mounting sleeves, each integral with a different one of the two end panels, for receiving the mounting nails. The two sleeves are mutually parallel when the box is erected and are either inclined to their adjacent fold lines or they are parallel to their adjacent fold lines to facilitate ganging of two electrical outlet boxes. The junction box, when erected, can be nailed into a stud or other building structural member by the mounting nails already attached to the box.

The resilient access means permits insertion of an electrical cable into the box through the outer panels and is comprised of at least one, or a pair of resilient movable entrance doors or bevelled access ways proximate to the inner edge of the panels in which they are formed. Each access way is comprised of at least one resilient flap or door which is secured to the panels along its proximal edge and moves apart to open upon the application of manual force to its distal facing edge. The resilient flap is sufficiently flexible and has a sharp proximal edge which grips or clamps on to the cable inserted through the entranceway and into the box. The swingaway door or flap consequently can act as a clamp against the cable to prevent removal of the cable once it has been inserted into the box.

The U-shaped flange-type recesses are provided in a boss integrally formed in the two end panels adjacent the outer edge thereof. Of course, the recesses could be formed to receive metal inserts from either the top or bottom side. The U-shaped flange-type recesses permit insertion of a Tinnerman-type nut, which is a very thin metal nut having a hole bordered by opposed lugs. It will be understood that similar types of recesses can be used for receiving other types of metal nuts or inserts to provide threading facility for the mounting screws of the electrical devices. When a screw is inserted by being pushed in lengthwise direction into the hole between the lugs, the lugs will resiliently yield to permit the screw to pass, and will resiliently engage the thread in locking manner upon completion of the insertion, thereby securing an electrical device in place.

The erected electrical outlet box of the present invention takes up a fraction of the volume of a conventional outlet box since it may be molded, shipped, handled and stored in a flat state. This represents a significant savings to the manufacturer, the shipper, the electrical distributor and the electrical contractor.

Moreover, the resilient access ways integrally formed in the side panels of the outlet box of this invention permit easy entrance of an electrical cable, at the same time providing a clamping action on the cable which eliminates the need for using a staple external to the outlet box. Because the electrical outlet box of this invention is molded in a flat state, a conventional Tinnerman-type nut can be used to quickly attach an electrical device to the outlet box and the Tinnerman-type nut can easily be placed into a molded recess with opposed bosses in the box.

The molded outlet box of this invention eliminates the need for the internal bosses necessary in the prior art devices. In the prior art devices, the outlet boxes were provided with cylindrical bosses which ran down the outer sides of the end walls. The bosses had tapped holes which cooperated with threaded elements, such as screws. The mounting screws and bosses were provided for the purpose of anchoring an electrical device to the junction outlet box.

The present invention does not eliminate the screw means for anchoring the electrical device to the junction outlet box, but eliminates the cylindrical bosses and provides U-shaped flange-type recesses into which are inserted Tinnerman-type nuts to firmly secure the electrical device to the erected junction outlet box. With the conventional assembly, it was necessary to turn each screw down many times in order to hold the electrical device. With the assembly of the present invention, only a few turns of the mounting screws after the pushing of the latter within the Tinnerman-type nuts are necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a side elevation view of the as-molded unerected flat electrical outlet box taken substantially along the line 2—2 of FIG. 1;

FIG. 3 is an end elevation view of the as-molded unerected flat electrical box taken substantially along the line 3—3 of FIG. 1;

FIG. 4 is an enlarged detailed sectional view of an alignment means of the present invention taken along the line 4—4 of FIG. 1, the erected position being shown in phantom;

FIG. 5 is an enlarged detailed sectional view of an alignment means of the present invention taken along the line 5—5 of FIG. 1, the erected position being shown in phantom;

FIG. 6 is an enlarged detailed sectional view of a living hinge of the electrical outlet box of the present invention taken substantially along the line 6—6 of FIG. 1, the erected position being shown in phantom;

FIG. 7 is an enlarged detailed sectional view of a resilient access way of the electrical outlet box of the present invention taken substantially along the line 7—7 of FIG. 1;

FIG. 8 is a perspective view of the fully folded and erected electrical outlet box of the present invention;

FIG. 9 is a perspective view showing two outlet boxes of the present invention adjacent to one another and conjointly forming a single double electrical outlet box capable of receiving two electrical devices;

FIG. 14 is an enlarged detailed plan view of a modified resilient latch;

FIG. 15 is a broken-away perspective view of a modified electrical junction box with an alternative clamping section for clamping electrical cables;

FIG. 16 is a perspective view of a separate clamp to be used with the junction box of FIG. 15; and FIG. 17 is a broken-away sectional view as taken on line 17—17 of FIG. 15 with the clamp of FIG. 16 mounted in position.

DETAILED DESCRIPTION OF THE PREFERRED EMBODIMENTS

Figure 1:
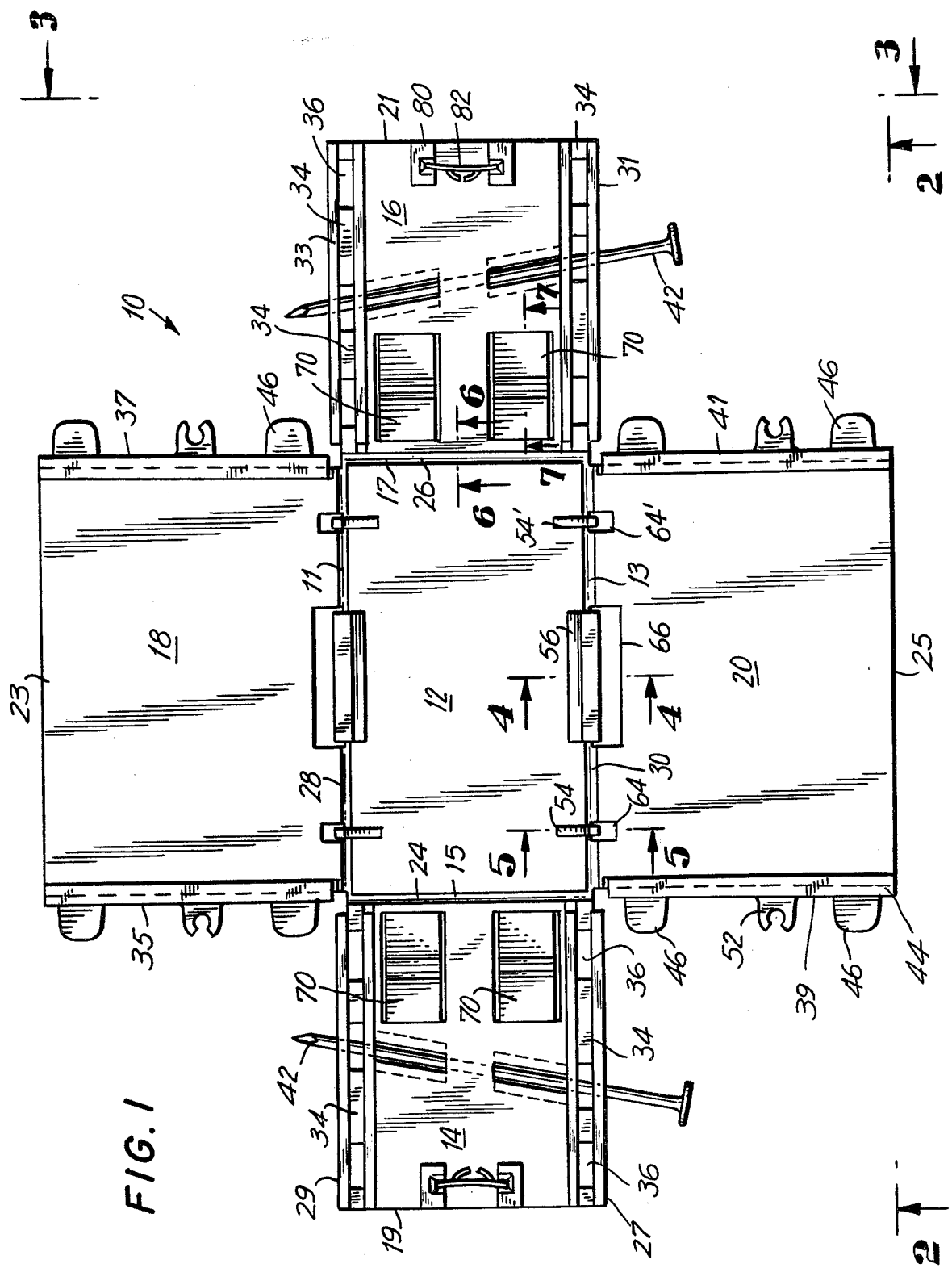
FIG. 1 is a plan view of an electrical outlet box of the present invention in its as-molded planar state prior to erection.

Referring more particularly to the drawings, wherein like numerals indicate like parts, there is seen in FIG. 1 an unerected outlet box blank indicated generally as 10 which is molded in a substantially planar or flattened state. The molded plastic, substantially planar blank 10 comprises a base wall or bottom panel 12 of rectangular configuration and having a pair of opposite longitudinal longer edges 11, 13 and a pair of opposite transverse shorter edges 15, 17. The blank 10 further comprises a pair of generally planar end walls or outer panels 14, 16 each having an inner edge located at and connected to a respective one of the transverse edges 15, 17 to thereby form a respective common edge therewith. The blank 10 still further comprises a pair of generally planar side walls or outer panels 18, 20 each having an inner edge located at and connected to a respective one of the longitudinal edges 11, 13 to thereby form a respective common edge therewith.

Each outer panel has the same predetermined wall thickness as the inner panel 12. Living hinges 24, 26, 28, 30 are of reduced wall thickness as compared to said predetermined thickness to thereby facilitate folding of each outer panel about its respective folding axis which extends along its corresponding common edge. Each outer panel is foldable between the generally flattened position in which the outer panels lie generally in the same plane as the plane of the inner panel (as shown in FIG. 1), to a folded erect position in which the outer panels assume predetermined positions and lie in respective planes each being generally perpendicular to the plane of the inner panel 12 (as shown in FIG. 8).

The outer panels 14, 16, 18, 20 each respectively have an outer edge 19, 21, 23, 25; and respective pairs of lateral or side edges 27, 29 and 31, 33 and 35, 37 and 39, 41. Outer panels 18 and 20 extend transversely away from longitudinal edges 11, 13 in one direction, and outer panels 14 and 16 extend transversely away from transverse edges 15, 17 in another direction at substantially right angles to said one direction to thereby form a cross-shaped configuration.

The as-molded outlet box blank 10 is thus comprised of a substantially planar sheetlike member having two parallel side-to-side living hinges 24, 26 and two parallel end-to-end living hinges 28, 30 defining five juxtaposed rectangular panels or walls in planar registration. The box blank 10 can be shipped in a flat state and thus will take up less storage room than an erected box. It is less bulky and easier to ship. When the side walls 18, 20 of the box blank 10 and end walls 14, 16 of the said box blank are folded into perpendicular positions relative to bottom wall 12, the three-dimensional structure of the erected box 10 is assumed (FIG. 8).

The lateral edges of end walls 14, 16 are provided with U-shaped channels 34 which fit over the lateral edges of the side walls 18, 20 in mating relationship when they all are in an erected position (see FIG. 8). At the same time, tabs 46 projecting from the lateral edges of the side walls 18, 20 extend through within slots 36 in the channels 34. Moreover, at this time, bifurcated yoke-like tabs 52 extending from the lateral edges of both side walls 18, 20 snap over opposite ends of the stems of mounting nails 42 when the box is erected. The slots defined by the resiliently-yieldable fingers of the yoke have constricted mouths so that they will snap over and engage the stems of the nails. In the embodiment of FIG. 1, the snap mounting of the tabs 52 on the nails 42 is essentially what holds the side walls 18, 20 to the end walls 14, 16 and maintains the structural integrity of the box 10 in its erected position. However, the fit of the tabs 46 in the slots 36 may be made tight enough to keep the box erected or the tabs 46 can be split like the bifurcated tab 100 in FIG. 14 to provide a snap fit of said tab 46 in the slots 36. Tab 100 has a pair of resiliently yieldable latch arms 102, 104 having leading ends 106, 108 and trailing ends 110, 112, as considered in direction of insertion of the tab into a corresponding slot. The latch arms are movable from the illustrated position towards each other during insertion of the leading ends through the respective slot. Once the leading ends have cleared the slot, the latch arms, due to their inherent resilience, move away from each other back towards the illustrated position. The undercut leading ends engage the walls bounding the slot with snap-type action. The leading ends are also tapered slightly to facilitate insertion. Of course, any alternate form of latching means may be utilized to hold the end walls to the side walls in erected condition of the outlet box.

The alignment of the side walls 18, 20 when they are folded substantially into an upright position perpendicular with respect to the bottom wall 12 is coordinated by a pair of stops 54, 54' on either side of stop 56, each stop cooperating with recesses 64, 64', 66, respectively. The abutment of projections 54, 54', 56 against cooperating overlapping portions of the side walls 18, 20 (see FIGS. 4 and 5) limits the amount of movement of the side walls 18, 20, respectively, with respect to the bottom wall 12. In other words, the side walls 18, 20 may be folded along the living hinges 28, 30, respectively, until the side walls 18, 20 substantially abut against the projections 54, 54', 56, respectively. The projections extend into slots 64, 64', 66 within the side walls 18, 20 and fully extend into the slots. The projections 54, 54', 56 abut against the walls 18, 20 and limit movement thereof beyond their predetermined positions which are substantially perpendicular to the bottom wall 12.

Referring particularly to FIG. 4, there is shown a projection 56 extending upwardly from the bottom wall 12 and there also is shown the living hinge 30 defining the linear zone or fold line between the bottom wall 12 and the side wall 20. When side wall 20 is swung up so that it is substantially perpendicular with respect to the bottom wall 12, the projection 56 fits and extends into a recess or slot 66 within the side wall 20, and the abutment surface 43 of the projection 56 abuts against the inside wall surface 45 which bounds the slot 66 of the side wall 20. The abutment surface 43 frictionally and tightly engages wall 45 and prevents wall 20 from returning to its original unfolded state.

With respect to FIG. 5, there is shown a substantially triangular projection 54 extending upwardly from the bottom wall 12. When the side wall 20 is swung into a substantially perpendicular position with respect to the bottom wall 12, along living hinge 30, the projection 54 extends into the slot 64 within the side wall 20 until the forward and upward inset edge or abutment surface 55 of the projection 54 abuts against the inner surface of the side wall 20. The projection 54 also has a horizontal surface 47 which frictionally and tightly engages wall 45 and prevents wall 20 from returning to its original unfolded state.

Figure 12:
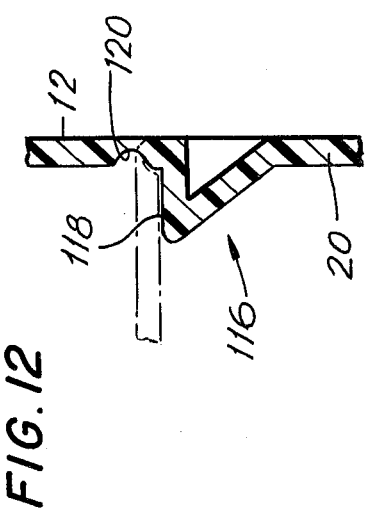
FIG. 12 is an enlarged detailed sectional view of yet another modified living hinge, the erected position being shown in phantom.

As for the modified form of the alignment means shown in FIG. 12, reference numeral 116 identifies yet another raised projection. However, it will be noted that raised projection 116 is of one-piece with the side wall 20, and further that no recess analogous to 64, 64' or 66 is provided. Upon folding about the living hinge 120, the abutment surface 118 abuts against the inner wall of base panel 12.

As in all of the alignment means described above, any forces directed towards the living hinges are diverted away from the latter, thereby contributing to the structural integrity of the junction outlet box.

Other shapes and configurations of projections 54, 54', 56, and 116 are, of course, possible which function in similar manner.

Each living hinge 24, 26, 28, 30 of FIG. 1 is of one-piece with the blank 10. As best shown in FIG. 6, representative hinge 26 comprises an upper 26' and a lower 26" groove respectively formed at the upper and lower major surfaces of the blank. Upper groove 26' has a planar base and a pair of side walls which extend linearly upwardly at an angle from its planar base to the upper major surface. Lower groove 26" has a pair of generally semi-circular cutouts to facilitate folding about the region of reduced thickness between the two grooves 26' and 26".

Figure 11:
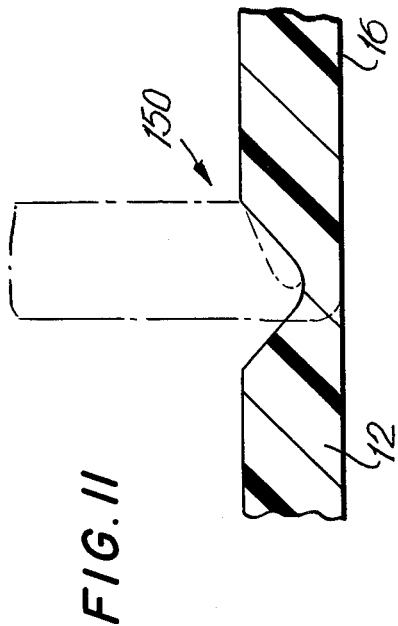
FIG. 11 is an enlarged detailed sectional view generally analogous to FIG. 6, but showing a modified living hinge, the erected position shown in phantom.

FIG. 11 shows another modified living hinge 150 which comprises a single groove formed at the upper surface of the blank. Hinge 150 includes an arcuate base wall, typically of 0.031 inches of radius of curvature, and a pair of side walls which incline linearly upwardly to the upper surface of the blank and which include an angle of approximately 95° therebetween.

In order to insert an electrical cable or the like into the folded-up box of FIG. 8, access means of one-piece with the end walls of the blank is provided. In the embodiment of FIGS. 1-8, a pair of resilient flaps or doors 70 are provided which together form an inwardly tapered or bevelled entrance opening for facilitating insertion of the cable. As best shown in FIG. 7, each flap 70 has an exterior proximal edge 70a of one-piece with the side panel and an interior distal edge 70b. The thickness of each flap 70 gradually decreases from a maximum thickness at proximal edge 70a to a minimum thickness at distal edge 70b. The side edges of the flaps are molded with a very thin break-away connection to the edges of triangular gussets 71'. A break-away frangible web 71, preferably with a screwdriver slot incorporated therein to facilitate breaking of the web, has a very thin thickness and spans the distance between both distal edges of flaps 70. The resilient doors 70 thus form a pair of opposed saloon-type swingable doors in the box.

Figure 13:
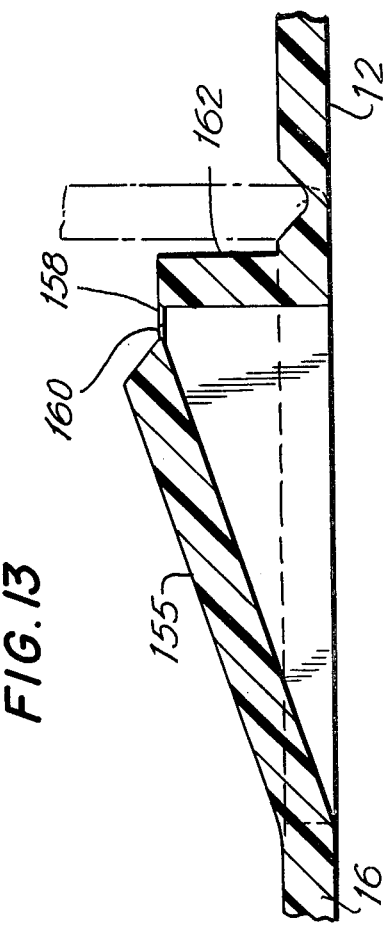
FIG. 13 is an enlarged detailed sectional view generally analogous to FIG. 7, but showing a modified resilient access way.

In operation, a user may employ a screwdriver or the like to tear the frangible web 71 and to break the connection between the latter and the flaps and also between the gussets 71' and the flaps 70 so that the resilient flaps cantilevering about their proximal edges can swing open inwardly of box 10 enough to permit ingress of an electrical wire cable. Because the flaps 70 are made of a synthetic plastic material and are resilient, the flaps will not only flex inwardly and allow entry of the cable, but will also flex outwardly due to their inherent resilience and engage and bite into a sheath of the cable which is inserted into the box and thus retain the cable in fixed clamped position when inserted in the box. Consequently, once a particular flap assembly is broken and the cables pass from the outside to the interior of the box 10, the distal edges of the flaps 70 lock on to the outer surface of the sheath of the cable which is inserted into the box. This effectively anchors the cable within the box 10 and thus acts as a safety feature of the box assembly. Alternatively, the resilient access means 70 may be constructed as shown in FIG. 13. Here, a single resilient flap 155 of uniform thickness has one proximal edge molded integrally with end wall 16. The other distal edge is connected by frangible web 158 to an inwardly extending support wall 162 which is of one-piece with base wall 12. Screwdriver slot 160 is formed in web 158 to facilitate the tearing of the connection between the flap 155 and the support wall 162. Once the web is broken, the cable may be inserted into the box and safely anchored therein as described above.

Still another feature of the outlet box 10 of this invention is the provision of a Tinnerman-type nut 82 for receiving a screw to mount an electrical device such as a receptacle or a switch. A pair of opposed U-shaped bosses 80 project from the inner surfaces of the end walls 14, 20 for receiving Tinnerman nuts 82. A Tinnerman nut is a very thin nut with opposed resilient lugs bordering a hole. If a mounting screw (not shown) is pushed through the hole between the tips of the lugs, the lugs will flex outwardly to permit the screw to pass. Once the pushing force is discontinued, the resilient lugs, due to their inherent resilience, will resiliently engage the threads of the screw. This engagement fixes the screw in place and thus an electrical device can be mounted within the box.

Because the electrical outlet box 10 is molded as a flat member, it is a relatively simple procedure to extrude the U-shaped bosses 80 as opposed to a cylindrical embossment with a threaded hole in it, as in prior art devices.

The aforementioned mounting nails 42, which are employed to mount the box to a building structure such as a stud, are slidably held in a predetermined orientation relative to the box. As best shown in FIG. 8, a pair of mounting sleeves 48 are integrally formed on each end wall. The sleeves are oriented at an acute angle with respect to the respective inner and outer edges of the end wall to which they are mounted. Thus, the nails 42 are held at suitable angles for subsequent mounting purposes by the workmen.

The FIG. 8 embodiment is dimensioned to permit the mounting of a single electrical device. If more than one electrical device is desired to be mounted, then it is necessary to resort to a multiple box construction such as the double box structure shown in FIG. 9. A pair of boxes 200, 202 are ganged one next to the other. The common side walls between the two boxes may be either folded downwardly out of the way into the illustrated dashed line positions, or they may be torn off or otherwise removed. Each box is generally identical to the box of FIG. 8, except for the fact that the mounting sleeves are not oriented at an acute angle relative to the folding axes, but instead are generally parallel to the respective folding axes of the end walls.

Thus, FIG. 9 illustrates two pairs of mounting sleeves 170, 172, each of which is parallel to and spaced at the same distance away from the inner and outer edges of their respective end walls to thereby permit alignment of these sleeves. A mounting nail 210 of approximately double the length of mounting nail 42 is now required for insertion through these aligned sleeves. The mounting nail will serve to hold the two boxes in side-by-side registry.

Figure 10:
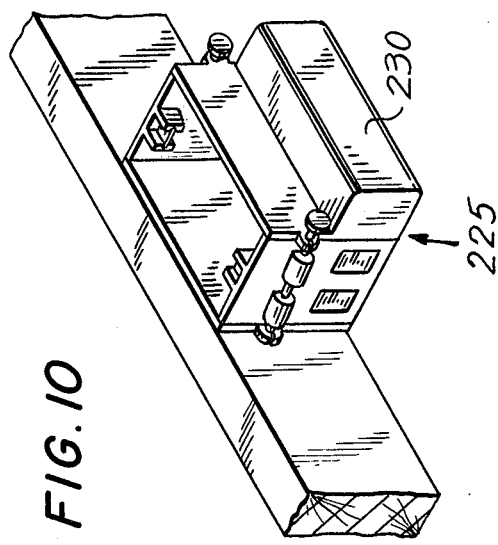
FIG. 10 is a perspective view generally analogous to FIG. 8, but showing a modified electrical outlet box mounted on a stud and having an extension section.

FIG. 10 shows a modified outlet box 225 whose open top is the same size as the top face of the FIG. 8 embodiment so that it can be covered by a single wall plate. If extra volume for the same overall stud height is desired, then an extension section or compartment 230 is formed of one-piece with one of the side walls. The interior of compartment 230 communicates with the interior of the box. It will be noted that the increase in volume achieved by the provision of this compartment is not readily obtainable by the one-piece non-foldable boxes of the prior art. Conventional molding techniques, other than sand-casting techniques, cannot produce the undercut of this compartment.

Turning now to FIGS. 15—17, another cable clamp arrangement is shown which comprises a first clamping member 250 formed of one-piece with end wall 14 adjacent the lower folding edge thereof. Clamp member 250 has a cable-engaging portion 252 which is roughened to facilitate frictional gripping of a cable, walls 254 bounding the groove 256, and extension wall 258. A separate discrete clamping member 260 is provided for the box. Clamping member 260 has a cable-engaging portion 262 which is roughened to facilitate frictional gripping of the cable, slide projection 264 at one end of the clamping member, and clamping teeth 268 at the other end of the clamping member. Projection 264 is dimensioned to slide closely within groove 256, and extension wall 258 is dimensioned to be tightly held between teeth 268 and the underside of clamping member 260.

In use, the leading end of a cable, particularly a Romex-type cable, is inserted through the aperture 270 formed in the end wall 14. One side of the trailing end of the cable is placed over cable-engaging portion 252. Thereupon, the clamp member 260 is placed over the other side of the trailing end of the cable by sliding projection 254 into groove 256 and by simultaneously inserting extension 258 behind teeth 268. Upon full installation of the two clamping members is juxtaposition with each other, they define a space therebetween which is smaller than the normal width of the cable. The cable-engaging portions thereby exert a slight compressive force over the cable exterior to thereby fixedly retain the latter in clamped position within the box.

Plastics which are preferred for use in making an electrical outlet box of the present invention are thermoplastic, flame-retardant and capable of forming a living hinge; these include, by way of example, polyethylene, polypropylene, acrylonitrile-butadiene-styrene copolymers, nylon, polyesters, flexibilized epoxies, acrylates, polycarbonates, and polyvinyl chloride and its copolymers.

It will be understood that each of the elements described above, or two or more together, may also find a useful application in other types of constructions differing from the types described above.

While the invention has been illustrated and described as embodied in a Foldable Electrical Outlet Box, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A substantially planar molded synthetic plastic material blank adapted for erection into an electrical outlet box of the type in which electrical devices such as switches, electrical receptacles, convenience outlets and the like are mounted, said blank comprising:
   (a) a substantially planar, synthetic plastic material, foldable member having
      (i) a generally planar base panel having a pair of opposite longitudinal edges and a pair of opposite transverse edges,
      (ii) a first pair of generally planar side panels each having an inner edge located at and connected to a respective one of said longitudinal edges to thereby form a respective common edge therewith,
      (iii) a second pair of generally planar side panels each having an inner edge located at and connected to a respective one of said transverse edges to thereby form a respective common edge therewith, and
      (iv) each pair of said first and said second pairs of side panels extending transversely away from said longitudinal and said transverse edges, respectively, along a pair of directions which are substantially orthogonal to one another to thereby form a generally cross-shaped configuration;
   (b) living hinge means of one-piece with said foldable member and being located lengthwise along each of said common edges, and being operative for facilitating folding of said side panels relative to said base panel about respective axes along which each of said common edges extends between a generally flattened position in which said side panels lie generally in the same plane as the plane of said base panel, and a folded erect position in which said side panels lie in respective planes each generally orthogonal to the plane of said base panel;
   (c) access means of one-piece with said foldable member, and operative for facilitating insertion of an electrical cable into the interior of the electrical outlet box when said panels have been folded to said folded erect position;
   (d) flange means of one-piece with said foldable member, and operative for facilitating mounting of an electrical device into the interior of the electrical outlet box;
   (e) engaging means of one-piece with said side panels, and operative for engaging a side panel of said first pair to a side panel of said second pair when said panels have been folded to said folded erect position, said engaging means including
      (i) a pair of tabs each projecting from an opposite lateral edge of one of said pairs of side panels, each tab having a nail-receiving opening, and
      (ii) a pair of slots each immediately adjacent an opposite lateral edge of the other of said pairs of side panels, each slot being dimensioned for receiving each corresponding tab when said panels are in said folded position; and
   (f) means for securing the electrical outlet box in said folded position to a building structural member, and also for maintaining the structural integrity of the box in said folded position, including
      (i) a pair of mounting nails each being insertable through a respective nail-receiving tab opening for attachment to the building structural member to thereby fix the relative orientations of said panels in said folded position and to concomitantly prevent said panels from moving out of their relative orientations in said folded position,
   whereby the foldable member is folded in situ at the building structural member and the structural integrity of the folded box is maintained by the mounting nails.

2. A blank as defined in claim 1, wherein said foldable member is constituted by resilient, electrically insulating, flame-retardant, thermoplastic material.

3. A blank as defined in claim 1, wherein said foldable member is constituted by synthetic plastic materials selected from the group consisting of polyethylene, polypropylene, acrylonitrile-butadiene-styrene copolymers, nylon, polyesters, flexibilized epoxies, acrylates, polycarbonates, and polyvinyl chloride and its copolymers.

4. A blank as defined in claim 1, wherein said base panel has a generally rectangular configuration with longer and shorter sides, and wherein said longitudinal and said transverse edges extend along said longer and said shorter sides, respectively.

5. A blank as defined in claim 1, wherein each side panel has an outer edge which extends generally parallel to its respective inner edge, and a pair of lateral edges which extend between the respective inner and outer edges and which are generally parallel to each other.

6. A blank as defined in claim 5, wherein said engaging means includes wall means forming a channel adjacent each lateral edge of one of said pairs of side panels, each channel being dimensioned for receiving each immediately adjacent lateral edge of the other of said pairs of side panels when said panels have been folded to said folded position.

7. A blank as defined in claim 5, wherein said engaging means includes a pair of tabs projecting from each lateral edge of one of said pairs of side panels and a pair of slots spaced apart from each other at each immediately adjacent lateral edge of the other of said pairs of side panels, each slot being dimensioned for receiving each corresponding tab when said panels have been folded to said folded position.

8. A blank as defined in claim 7, wherein each tab has a tapered leading end for facilitating entry into its respective slot.

9. A blank as defined in claim 7, wherein each tab has a pair of movable latch arms each having a leading end, each latch arm being constituted by resilient material and being movable from an unlatched position in which said arms are moved towards each other during insertion of the leading arm ends through the respective slot, to a latched position in which said arms move apart from each other after said leading arm ends have fully passed through the respective slot.

10. A blank as defined in claim 5, wherein said engaging means includes a pair of mounting nails for securing the electrical outlet box to a building structural member, sleeve means of one-piece with one of said pairs of side panels and operative for slidably holding said nails, and a resilient mounting ear projecting from each lateral edge of the other of said pairs of side panels, each ear being bifurcated and shaped to engage spaced portions of each mounting nail with snap-type action.

11. A substantially planar molded synthetic plastic material blank adapted for erection into an electrical outlet box of the type in which electrical devices such as switches, electrical receptacles, convenience outlets and the like are mounted, said blank comprising:
 (a) a substantially planar, synthetic plastic material, foldable member having
  (i) a generally planar base panel having a pair of opposite longitudinal edges and a pair of opposite transverse edges,
  (ii) a first pair of generally planar side panels each having an inner edge located at and connected to a respective one of said longitudinal edges to thereby form a respective common edge therewith,
  (iii) a second pair of generally planar side panels each having an inner edge located at and connected to a respective one of said transverse edges to thereby form a respective common edge therewith,
  each side panel having an outer edge which extends generally parallel to its respective inner edge, and a pair of lateral edges which extend between the respective inner and outer edges and which are generally parallel to each other, and
  (iv) each pair of said first and said second pairs of side panels extending transversely away from said longitudinal and said transverse edges, respectively, along a pair of directions which are substantially orthogonal to one another to thereby form a generally cross-shaped configuration;
 (b) living hinge means of one-piece with said foldable member and being located lengthwise along each of said common edges, and being operative for facilitating folding of said side panels relative to said base panel about respective axes along which each of said common edges extends between a generally flattened position in which said side panels lie generally in the same plane as the plane of said base panel, and a folded erect position in which said side panels lie in respective planes each generally orthogonal to the plane of said base panel;
 (c) engaging means of one-piece with said side panels, and operative for connecting a side panel of said first pair to a side panel of said second pair when said panels have been folded to said folded erect position, said engaging means including
  (i) a pair of mounting nails for securing the electrical outlet box to a building structural member, sleeve means of one-piece with one of said pairs of side panels and operative for slidably holding said nails, and a resilient mounting ear projecting from each lateral edge of the other of said pairs of side panels, each ear being bifurcated and shaped to engage spaced portions of each mounting nail with snap-type action;
 (d) access means of one-piece with said foldable member, and operative for facilitating insertion of an electrical cable into the interior of the electrical outlet box when said panels have been folded to said folded erect position; and
 (e) flange means of one-piece with said foldable member, and operative for facilitating mounting of an electrical device into the interior of the electrical outlet box.

12. A blank as defined in claim 11, wherein said sleeve means extends along a line which is inclined relative to said outer and said inner edges of the respective channel.

13. A blank as defined in claim 11; and further comprising an additional foldable member identical to said first-mentioned foldable member and foldable into an electrical outlet box identical to said first-mentioned electrical outlet box, and wherein each box has sleeve means which extends along a line which is generally parallel to said outer and said inner edges of the respective panel, and wherein both sleeve means are aligned with each other to thereby permit each single mounting nail to be held by each respective pair of aligned sleeve means.

14. A blank as defined in claim 1, wherein each side panel and said base panel has the same predetermined wall thickness, and wherein said living hinge means includes means for reducing the wall thickness along each common edge to a thickness less than said predetermined wall thickness.

15. A blank as defined in claim 14, wherein said reducing means includes a groove extending along each common edge at one major surface of said foldable member.

16. A blank as defined in claim 14, wherein said reducing means includes a first groove extending along each common edge at one major surface of said foldable member, and a second groove extending along each common edge at the other major surface of said foldable member.

17. A blank as defined in claim 1; and further comprising alignment means for limiting movement of at least one pair of said side panels beyond their respective orthogonal planes.

18. A blank as defined in claim 17, wherein said alignment means includes at least two raised projections each having abutment surfaces spaced apart of each other and situated proximal to a common edge between said base panel and each side panel of said one pair, each side panel of said one pair having slots corresponding to said raised projections so that, during folding, each raised projection fits within a corresponding slot and each abutment surface abuts against each side panel of said one pair to thereby limit movement of said side panels to orientations beyond their respective orthogonal planes and also to thereby provide stability to the folded erect position.

19. A blank as defined in claim 18, wherein each abutment surface frictionally engages a border wall bounding the corresponding slot.

20. A blank as defined in claim 18, wherein each abutment surface frictionally engages the inner wall surface of the corresponding side panel.

21. A blank as defined in claim 1, wherein said access means includes means forming an inwardly tapered entrance opening for facilitating insertion of the cable into the box interior.

22. A blank as defined in claim 21, wherein said tapered access means includes at least one resilient flap having an exterior proximal edge of one-piece with the side panel, and an interior distal edge movable between an access position in which insertion of the cable is permitted, and a clamped position in which the cable is retained in fixed position within the box.

23. A blank as defined in claim 22; and further comprising break-away means for connecting said interior distal edge to said foldable member in a fragile manner, said break-away means including a frangible zone intermediate said foldable member and said interior distal edge to thereby permit movement of said flap between its respective positions.

24. A blank as defined in claim 21, wherein said tapered access means includes two resilient flaps each having an exterior proximal edge of one-piece with a side panel, and an interior distal edge movable between an access position in which insertion of the cable between the flaps is permitted, and a clamped position in which the cable is retained intermediate the flaps in fixed position within the box.

25. A blank as defined in claim 5, wherein said flange means includes an opposite pair of facing U-shaped sections of one-piece with a side panel adjacent said outer edge thereof, said U-shaped sections defining facing recesses for receiving a mounting insert for the electrical device.

26. A blank as defined in claim 1, wherein said access means includes an aperture, and a first clamping section of one-piece with one of said side panels and being located at one side of said aperture; and further comprising means for clamping the cable after insertion through said aperture, said clamping means including a second discrete clamping section movable from a remote position away from said first clamping section, to another position in which said second clamping section is situated at the other side of said aperture at a spacing relative to said first clamping section to thereby clamp the cable between said clamping sections.

27. A blank as defined in claim 1; and further comprising means for increasing the volume of the electrical outlet box, said volume-increasing means including an extension of one-piece with one of said panels and having an interior which communicates with the interior of the electrical outlet box.

28. An electrical outlet box erected from the blank of claim 1 by the steps of swinging the side panels to extend perpendicularly in a common direction from the base panel, and engaging and positively locking said side panels to each other in series to form a rectangular ring circumscribing the base panel.

29. A process of making an electrical outlet box, comprising the steps of providing a blank as set forth in claim 1, erecting the blank into a box by swinging the side panels in a common direction to positions perpendicular to the base wall, and thereafter engaging and locking them in a series succession to form a ring circumscribing the base panel.

30. A substantially planar molded synthetic plastic material blank adapted for erection into an electrical outlet box of the type in which electrical devices such as switches, electrical receptacles, convenience outlets and the like are mounted, said blank comprising:
(a) a substantially planar, synthetic plastic material, foldable member having
  (i) a generally planar base panel having a pair of opposite longitudinal edges and a pair of opposite transverse edges,
  (ii) a first pair of generally planar side panels each having an inner edge located at and connected to a respective one of said longitudinal edges to thereby form a respective common edge therewith,
  (iii) a second pair of generally planar side panels each having an inner edge located at and connected to a respective one of said transverse edges to thereby form a respective common edge therewith,
    ech side panel having an outer edge which extends generally parallel to its respective inner edge, and a pair of lateral edges which extend between the respective inner and outer edges and which are generally parallel to each other, and
  (iv) each pair of said first and said second pairs of side panels extending transversely away from said longitudinal and said transverse edges, respectively, along a pair of directions which are substantially orthogonal to one another to thereby form a generally cross-shaped configuration;
(b) living hinge means of one piece with said foldable member and being located lengthwise along each of said common edges, and being operative for facilitating folding of said side panels relative to said base panel about respective axes along which each of said common edges extends between a generally flattened position in which said side panels lie generally in the same plane as the plane of said base panel, and a folded erect position in which said side panels lie in respective planes each generally orthogonal to the plane of said base panel;
(c) engagine means of one-piece with said side panels, and operative for connecting a side panel of said first pair to a side panel of said second pair when said panels have been folded to said folded erect position, said engaging means including
  (i) a pair of tabs projecting from each lateral edge of one of said pairs of side panels and a pair of slots spaced apart from each other at each immediately adjacent lateral edge of the other of said pairs of side panels, each slot being dimensioned for receiving each corresponding tab when said panels have been folded to said folded position, each tab having a pair of movable latch arms each having a leading end, each latch arm being constituted by resilient material and being movable from an unlatched position in which said arms are moved towards each other during insertion of the leading arm ends through the respective slot, to a latched position in which said arms move apart from each other after said leading arm ends have fully passed through the respective slot.

(d) access means of one-piece with said foldable member, and operative for facilitating insertion of an electrical cable into the interior of the electrical outlet box when said panels have been folded to said folded erect position; and (e) flange means of one-piece with said foldable member, and operative for facilitating mounting of an electrical device into the interior of the electrical outlet box.

31. In a synthetic plastic material electrical outlet box having bottom, side and end walls for enclosing electrical terminals to which electrical cable conductors are to be connected, the improvement comprising:

cable access means on one of the walls of the outlet box, said cable access means including at least one cantilever flap having a proximal stationary edge on said one box wall, and an opposite distal edge which is movable relative to said one box wall from an initial unflexed position in a direction inwardly of the outlet box to a flexed position in which the distal edge of said one flap is spaced away from said one box wall for a distance sufficient to permit insertion of an electrical cable conductor into the interior of the outlet box, said cantilever flap being constituted of resilient material which constantly urges the flap due to its inherent resilience back towards its initial unflexed position such that the distal edge of the flap frictionally engages the inserted electrical cable conductor and clamps the same against said one box wall to thereby anchor the cable conductor and prevent its unauthorized disconnection for the electrical terminals within the outlet box.

32. The improvement as defined in claim 31, wherein the distal edge of said one flap is connected to said one box wall by a thin break-away web which can be broken with ease.

33. The improvement as defined in claim 31, and further comprising an additional cantilever flap mounted for swinging movement on said one box wall, and wherein said flaps are molded integrally with said one box wall and are, as molded, inclined inwardy into the outlet box, and wherein said one box wall further includes gussets to the edges of which the distal edges of the flaps are joined lightly by frangible zones.

* * * * *